(12) United States Patent
Anderson et al.

(10) Patent No.: US 9,426,518 B2
(45) Date of Patent: Aug. 23, 2016

(54) RECORDING VIDEO CONTENT IN RELEVANT SEGMENTS OF A TELEVISION PROGRAM BASED ON IDENTIFYING KEYWORDS IN ON-SCREEN TEXT, CLOSED CAPTIONING TEXT AND/OR PROGRAM AUDIO

(71) Applicant: International Business Machines Corporation, Armonk, NY (US)

(72) Inventors: Erik D. Anderson, Austin, TX (US); William A. Griffith, Austin, TX (US); Indran Naick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/462,742

(22) Filed: Aug. 19, 2014

(65) Prior Publication Data

US 2016/0057482 A1 Feb. 25, 2016

(51) Int. Cl.
*H04N 5/76* (2006.01)
*H04N 9/80* (2006.01)
*H04N 21/433* (2011.01)
*G11B 27/34* (2006.01)
*G11B 27/22* (2006.01)
*H04N 21/432* (2011.01)
*H04N 21/4147* (2011.01)
*H04N 21/44* (2011.01)
(Continued)

(52) U.S. Cl.
CPC ............ *H04N 21/4334* (2013.01); *G11B 27/22* (2013.01); *G11B 27/34* (2013.01); *H04N 21/4147* (2013.01); *H04N 21/4325* (2013.01); *H04N 21/4332* (2013.01); *H04N 21/4394* (2013.01); *H04N 21/44008* (2013.01); *H04N 21/4755* (2013.01); *H04N 21/47214* (2013.01); *H04N 21/8405* (2013.01)

(58) Field of Classification Search
USPC .................................. 386/239–262, 291–299
See application file for complete search history.

(56) References Cited

U.S. PATENT DOCUMENTS 8,345,831 B2 1/2013 Anderson
2007/0192310 A1* 8/2007 Takagi .............. G06F 17/30038
(Continued)

FOREIGN PATENT DOCUMENTS

WO 2008129377 A1 10/2008

OTHER PUBLICATIONS

"Facial Recognition," http://www.wavestore.com/page/video-analytics/facial-recognition, 2012, 1 page.
(Continued)

*Primary Examiner* — Hung Dang
(74) *Attorney, Agent, or Firm* — Robert A. Voigt, Jr.; Winstead, P.C.

(57) ABSTRACT

A method, digital video recorder device and computer program product for recording program content. The digital video recorder (DVR) receives a selection of a television program or a television channel to record video content as well as the time period to record the video content in the selected television program or in the television program airing on the selected television channel from a user. Furthermore, the DVR receives keyword(s) to trigger the recording of the video content in the television program from the user. The DVR monitors the television program or the television channel for keyword(s) entered by the user in on-screen text, closed captioning text and/or program audio. In response to detecting one or more of these keyword(s) in the on-screen text, closed captioning text and/or program audio, the DVR records the video content in the television program for the selected period of time.

20 Claims, 6 Drawing Sheets

(51) Int. Cl.
*H04N 21/439* (2011.01)
*H04N 21/475* (2011.01)
*H04N 21/472* (2011.01)
*H04N 21/8405* (2011.01)

(56) References Cited

U.S. PATENT DOCUMENTS

2007/0212023 A1* 9/2007 Whillock .......... G06F 17/30787
386/281

2013/0108242 A1* 5/2013 Oliver ................ H04N 21/4334
386/244

OTHER PUBLICATIONS

"Video Analytics," http://www.wavestore.com/page/video-analytics, 2012, 1 page.
"The Benefits of Intelligence 2," ww.intellio.eu, pp. 1-8.
"Intelli-Vision," http://www.intelli-vision.com, 2012, 1 page.
"Casino and Hotel Security & Surveillance Solutions," http://vs-us.com/dvr_gaming.html, 2012, pp. 1-2.

* cited by examiner

RECORDING VIDEO CONTENT IN RELEVANT SEGMENTS OF A TELEVISION PROGRAM BASED ON IDENTIFYING KEYWORDS IN ON-SCREEN TEXT, CLOSED CAPTIONING TEXT AND/OR PROGRAM AUDIO

TECHNICAL FIELD

The present invention relates generally to consumer digital video recording devices (DVRs), and more particularly to recording video content in relevant segments of a television program based on identifying keywords in on-screen text, closed captioning text and/or program audio.

BACKGROUND

Digital video recorders (DVRs), which may be in the form of a portable device, such as a personal video recorder (PVR), a set-top box or a computer having a video interface and/or video capability provided from a digital or analog network source, are becoming ubiquitous in households and other locations. DVRs record video content, such as video content from a television program, in a digital format to a disk drive, USB flash drive, SD memory card, SSD or other local or networked mass storage device.

Typically, DVR devices provide a menu-driven graphical user interface (GUI) on a display, such as a television screen, where the user can select channels and television programs, such as via a remote control device, and set the DVR to record the selected television programs when the programs are being broadcasted. Once the viewer has set up the channels and programs to record, the recording schedule is saved in the DVR hard drive. The DVR automatically records the programs when these programs are broadcasted by the television stations using the recording schedule. The user can later play back the recorded video, such as on a television set.

Currently, users do not have the capability of recording relevant subsets of television programs, such as recording portions of a television program directed to a specific topic or topics. Instead, the DVR will record the entire television program, including portions of the television program that the user may not be interested in viewing thereby wasting space on the storage device as well as forcing the user to fast forward through sections of the recorded television program that the user is not interested in viewing thereby diminishing the user's experience.

BRIEF SUMMARY

In one embodiment of the present invention, a method for recording program content comprises receiving a selection of a television program or a television channel to record video content. The method further comprises receiving a selection of a period of time to record the video content in the selected television program or in a television program airing on the selected television channel. The method additionally comprises receiving one or more keywords to trigger recording the video content in the selected television program or in the television program airing on the selected television channel. Furthermore, the method comprises monitoring the television program or the television channel for the one or more keywords in on screen text, program audio and/or closed captioning text. Additionally, the method comprises detecting, by a processor, one or more of the one or more keywords in the on screen text, the program audio and/or the closed captioning text in the selected television program or in the television program airing on the selected television channel. In addition, the method comprises recording the video content in the selected television program or in the television program airing on the selected television channel for the selected period of time in response to detecting the one or more of the one or more keywords in the on screen text, the program audio and/or the closed captioning text in the selected television program or in the television program airing on the selected television channel.

Other forms of the embodiment of the method described above are in a digital video recorder device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, digital video recorder device and computer program product for recording program content. The digital video recorder receives a selection of a television program or a television channel to record video content as well as the time period (e.g., 5 minutes) to record the video content in the selected television program or in the television program airing on the selected television channel from a user. Furthermore, the digital video recorder receives keyword(s) (e.g., "stimulus," "Detroit Tigers") to trigger the recording of the video content in the television program from the user. The digital video recorder monitors the selected television program or the selected television channel for keyword(s) entered by the user in on-screen text, closed captioning text and/or program audio. In response to detecting one or more of these keyword(s) in the on-screen text, closed captioning text and/or program audio, the digital video recorder records the video content in the selected television program or in the television program airing on the selected television channel for the selected period of time. In this manner, the user will be able to record video content in relevant segments of a television program thereby saving space on the storage device (no longer storing video content that the user has no interest in viewing) and enhancing the user's experience (the user no longer has to spend time fast forwarding through sections of the recorded television program that the user is not interested in viewing).

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
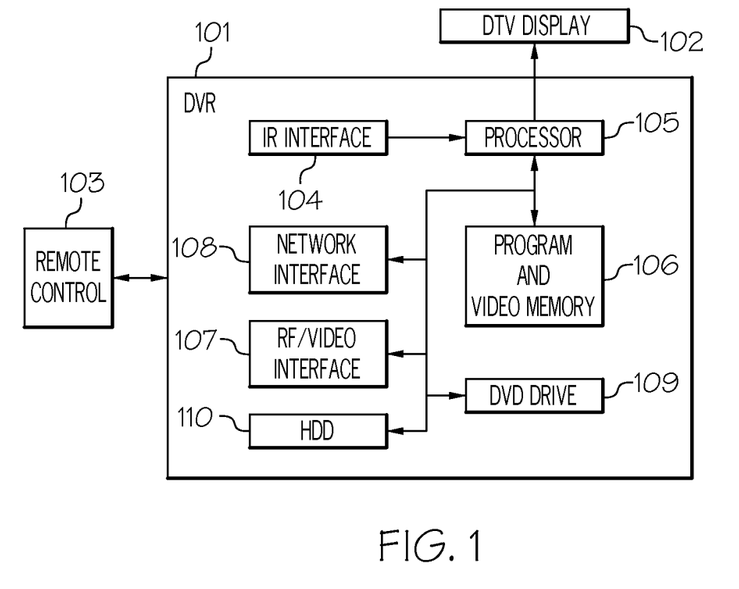
FIG. 1 illustrates a digital video recorder (DVR) configured in accordance with an embodiment of the present invention.

Referring now to the Figures in detail, FIG. 1 illustrates a digital video recorder (DVR) 101 configured in accordance with an embodiment of the present invention. DVR 101 is connected to an external digital television (DTV) display 102, but DVR 101 may alternatively be a portable device having an integral display. A remote control 103 is used to control operation of DVR 101, in the exemplary embodiment according to methods of the present invention, in order to provide user input. However, it is understood that other user input methodologies can be employed, such as buttons and other controls integral to DVR 101.

DVR 101 includes an infrared (IR) interface 104 for receiving commands from remote control 103, a processor 105 for executing program instructions for recording video content in relevant segments of a television program based on identifying keywords in on-screen text, closed captioning text and/or program audio as discussed further below as well as provides control and other functionality as generally associated with DVR operations. A program and video memory 106 is coupled to processor 105 for storing data and program instructions, including program instructions (e.g., program instructions for recording video content in relevant segments of a television program based on identifying keywords in on-screen text, closed captioning text and/or program audio) in accordance with a computer program product embodiment of the present invention. A radio-frequency (RF)/video interface 107 receives video signals or RF signals from broadcast, closed-circuit or other video streaming sources and provides them for selection by processor 105 for ultimate display by DTV display 102. A network interface 108 provides wired or wireless connection to public or private networks, such as the Internet, for receiving any information associated with video streams received by RF/video interface 107. Alternatively, network interface 108 may constitute the entire interface for receiving both the video streams (e.g., MPEG streams) and optional additional sideband information. A digital versatile disc (DVD) drive 109 and hard disk drive (HDD) 110 are also included in DVR 101 both for recording video program and other information. In some embodiments, components, such as DVD drive 109, HDD 110, and IR interface 104 may not be present, may be located in other devices, or may be replaced with other technologies, such as solid-state drives (SSD), Blu-ray Disc (BD) drives, Bluetooth interfaces, RF interfaces, WiFi interfaces, and the like. DVR 101 is not to be limited in scope to the elements depicted in FIG. 1 and may include different or additional elements than depicted in FIG. 1.

Figure 2:
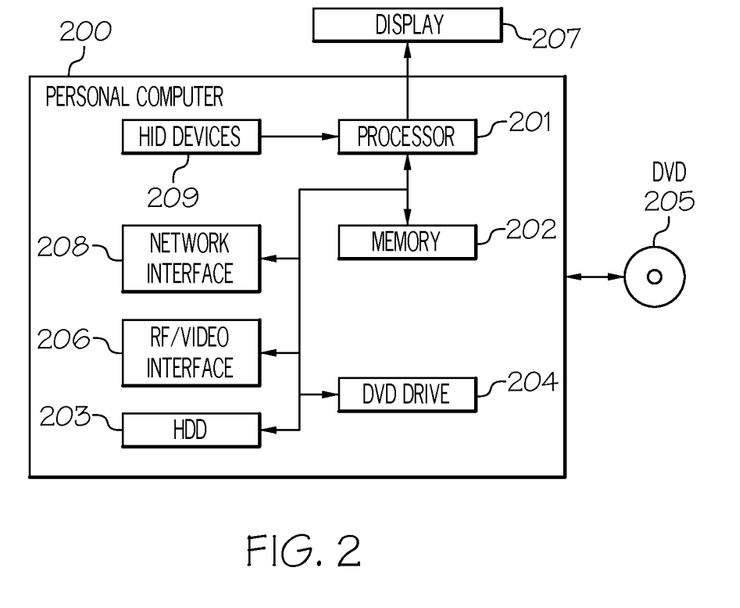
FIG. 2 illustrates a DVR in accordance with another embodiment of the present invention in the form of a personal computer system.

Referring now to FIG. 2, FIG. 2 illustrates a DVR in accordance with another embodiment of the present invention in the form of a personal computer system 200. DVR is implemented by personal computer system 200, which includes a processor 201 coupled to a memory 202 for storing program instructions including program instructions for implementing a DVR, for example by executing a third-party DVR program. Memory 202 further includes program instructions for recording video content in relevant segments of a television program based on identifying keywords in on-screen text, closed captioning text and/or program audio as discussed further below, which may be integrated in such a DVR program, or may be provided as a stand-alone application or plug-in that enhances functionality of the DVR program or operating system. The program may be loaded into memory 202 or HDD 203 from a DVD drive 204 from a media forming a computer program product in accordance with an embodiment of the present invention, such as DVD disc 205.

In order to receive video information from closed-circuit or broadcast sources, personal computer 200 includes a radio-frequency (RF)/video interface 206. In one embodiment, RF/video interface 206 receives video signals or RF signals from broadcast, closed-circuit or other video streaming sources and provides them for selection by processor 201 for ultimate display, such as on display 207.

Personal computer 200 further includes a network interface 208 which provides wired or wireless connection to public or private networks, such as the Internet, for receiving any information associated with video streams received by RF/video interface 206.

Personal computer 200 also includes a human interface device (HID) interface 209 for connection of HIDs, such as keyboards and pointing devices. Personal computer 200 is also illustrated as connected to external display 207. However, if personal computer 200 is a laptop, tablet or other integrated device, display 207 will generally be integral to personal computer 200. In some embodiments, some of the components shown in FIG. 2 may be absent, located within another device, or may be substituted with other technologies. Personal computer 200 is not to be limited in scope to the elements depicted in FIG. 2 and may include different or additional elements than depicted in FIG. 2.

Figure 3:
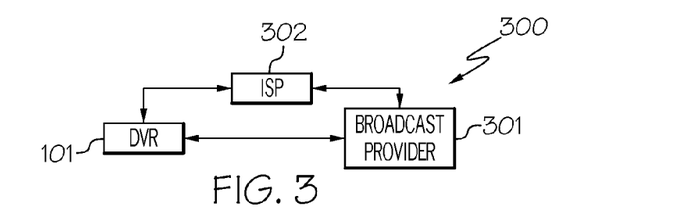
FIG. 3 illustrates a networked system configured in accordance with an embodiment of the present invention.

Referring now to FIG. 3, a networked system 300 in accordance with an embodiment of the present invention is shown. A DVR, such as DVR 101, as illustrated in FIG. 1, receives signals from one or more broadcast providers 301, through one or more channels as mentioned above, e.g., RF broadcast, satellite broadcast and/or closed-circuit cable. DVR 101 may also receive video information from a generic network data source, such as an Internet Service Provider (ISP) 302 or other network provider, which may also be the channel that provides video data from broadcast provider 301, obviating any need for an RF/video connection. The depicted system is only exemplary and is intended to illustrate various locations for sending video and video information to DVR 101 for viewing of video content. However, it is understood that other techniques and system configurations may be applied in accordance with other embodiments of the present invention and the particular system configuration should not be construed as limiting the possible system configurations, data sources and end-user appliances that implement techniques in accordance with the present invention as described in further detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, typically, DVR devices provide a menu-driven graphical user interface (GUI) on a display, such as a television screen, where the user can select channels and television programs, such as via a remote control device, and set the DVR to record the selected television programs when the programs are being broadcasted. Once the viewer has set up the channels and programs to record, the recording schedule is saved in the DVR hard drive. The DVR automatically records the programs when these programs are broadcasted by the television stations using the recording schedule. The user can later play back the recorded video, such as on a television set. Currently, users do not have the capability of recording relevant subsets of television programs, such as recording portions of a television program directed to a specific topic or topics. Instead, the DVR will record the entire television program, including portions of the television program that the user may not be interested in viewing thereby wasting space on the storage device as well as forcing the user to fast forward through sections of the recorded television program that the user is not interested in viewing thereby diminishing the user's experience.

Figure 4A:
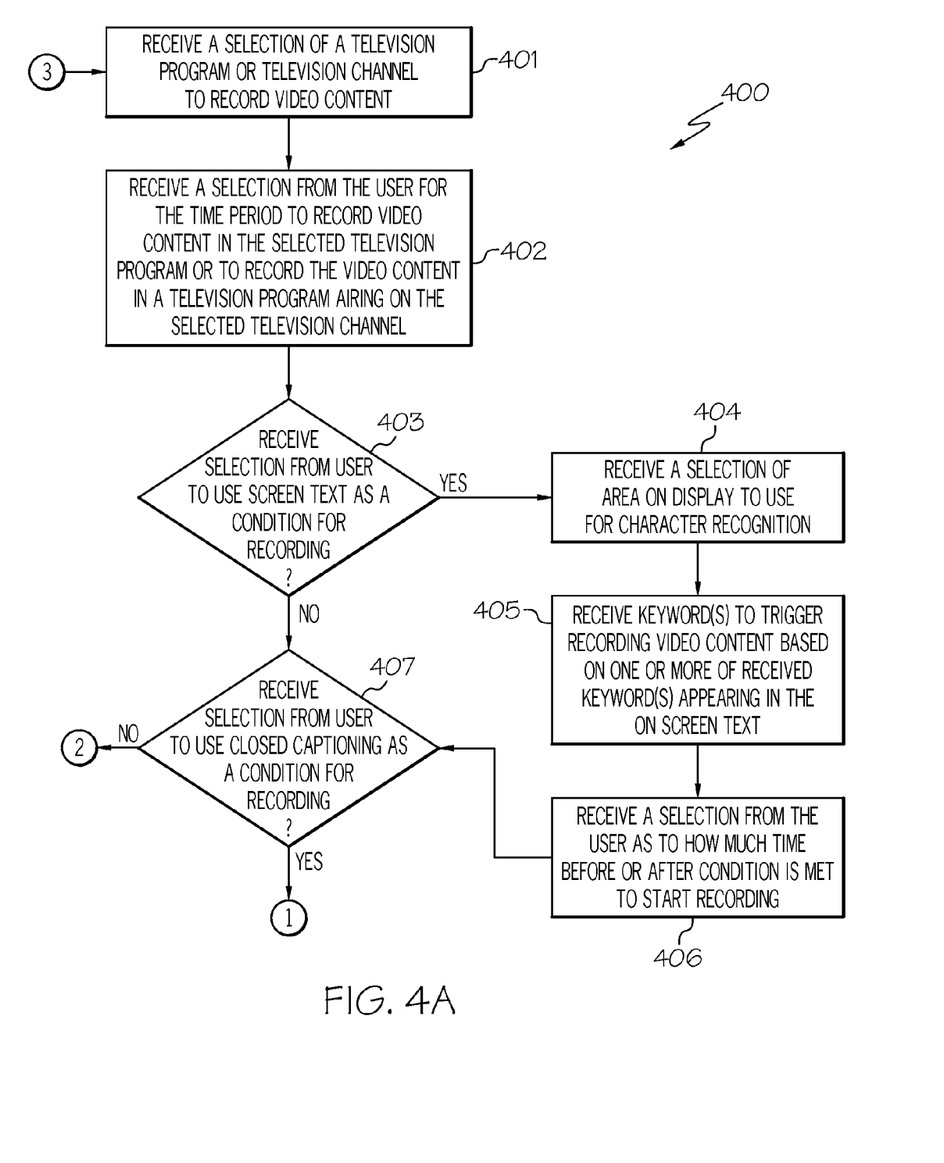
FIGS. 4A-4C are a flowchart of a method for establishing the conditional criteria to be used in determining when to record a segment of a television program in accordance with an embodiment of the present invention.
Figure 4B:
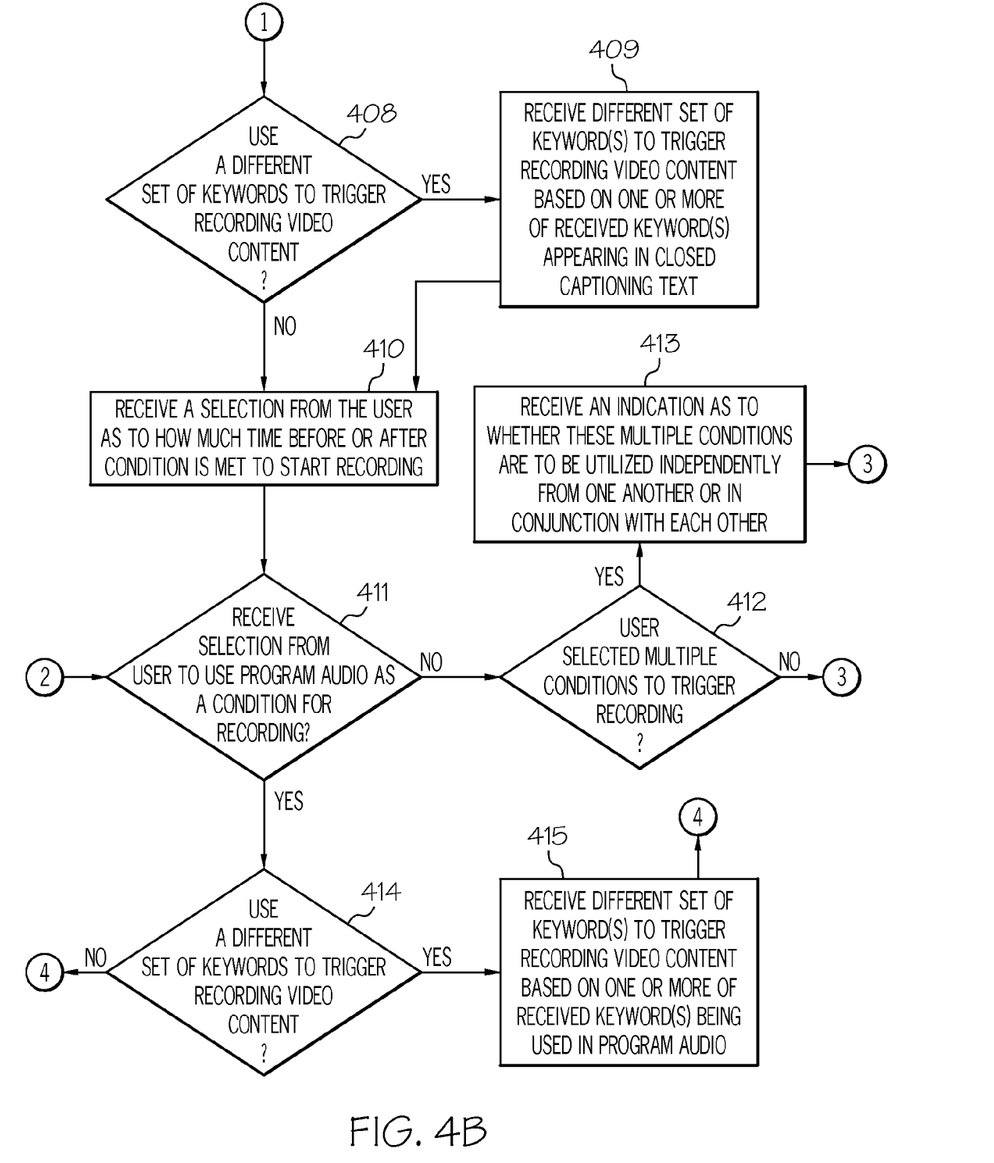
Figure 4C:
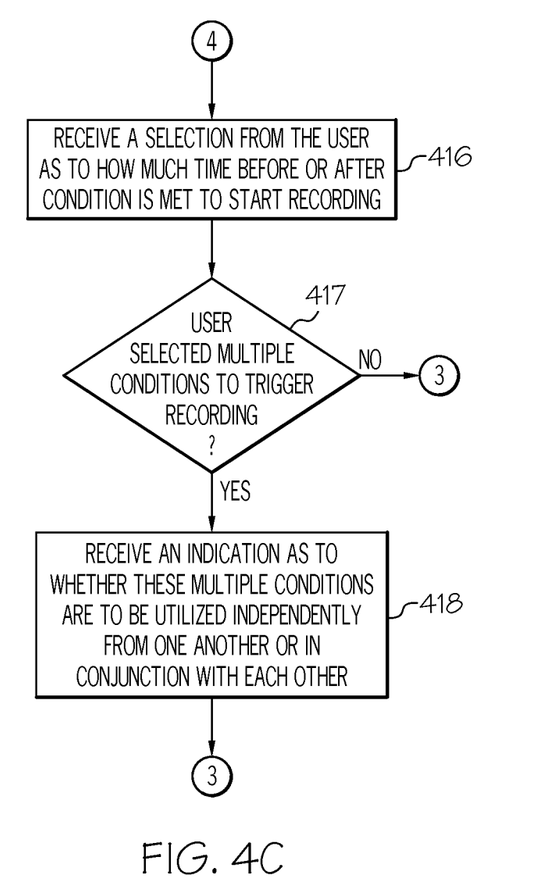
Figure 5:
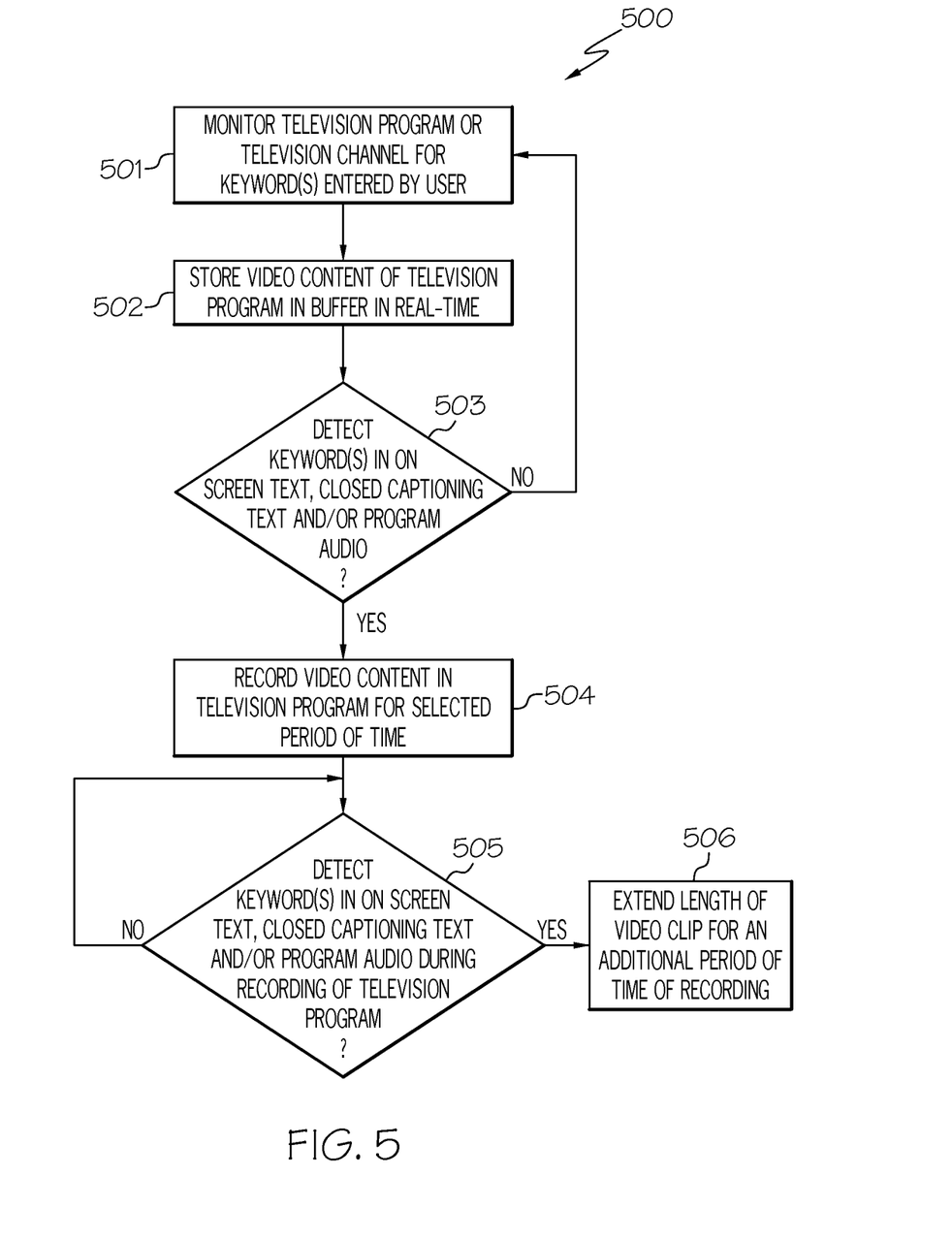
FIG. 5 is a flowchart of a method for recording video content in relevant segments of a television program based on identifying keywords in on-screen text, closed captioning text and/or program audio in accordance with an embodiment of the present invention.
Figure 6:
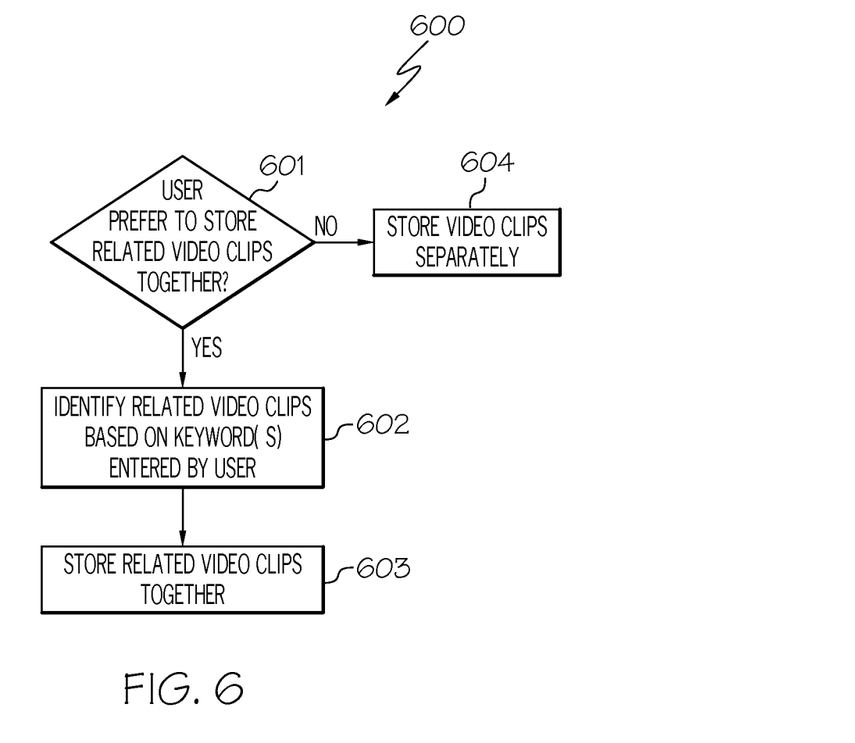
FIG. 6 is a flowchart of a method for storing related video clips together so that the user can view the related recorded video content all together in the same setting in accordance with an embodiment of the present invention.

The principles of the present invention provide a means for recording video content in relevant segments of a television program, such as based on identifying keywords in on-screen text, closed captioning text and/or program audio, as discussed further below in association with FIGS. 4A-4C, 5 and 6. FIGS. 4A-4C are a flowchart of a method for establishing the conditional criteria (e.g., keyword(s) to be found in on-screen text, closed captioning text and/or program audio) to be used in determining when to record a segment of a television program. FIG. 5 is a flowchart of a method for recording video content in relevant segments of a television program based on identifying keywords in on-screen text, closed captioning text and/or program audio. FIG. 6 is a flowchart of a method for storing related video clips together so that the user can view the related recorded video content all together in the same setting.

As discussed above, FIGS. 4A-4C are a flowchart of a method 400 for establishing the conditional criteria to be used in determining when to record a segment of a television program in accordance with an embodiment of the present invention.

Referring to FIG. 4A, in conjunction with FIGS. 1-3, in step 401, DVR 101, personal computer 200 receives a selection of a television program or a television channel to record video content from the user, such as the user of DVR 101. For example, DVR 101 may provide a menu-driven graphical user interface (GUI) on DTV display 102 where the user can select television programs or television channels, such as via remote control device 103. For all user selections, as discussed below, such selections may be accomplished by the user utilizing such a GUI. That is, DVR 101, personal computer 200 may receive user inputs and selections via such a GUI.

In step 402, DVR 101, personal computer 200 receives a selection from the user for the time period (e.g., 5 minutes) to record the video content in the selected television program or to record the video content in a television program airing on the selected television channel.

In step 403, a determination is made by DVR 101, personal computer 200 as to whether the user selected the option of using screen text as a condition for recording. Screen text, as used herein, refers to any text that is displayed on a display, such as DTV display 102, display 207, during the television program (e.g., name of a sports team (e.g., Detroit Tigers) that is currently being discussed, the words directed to the topic (e.g., stimulus plan) that is currently being discussed, severe weather alerts, opening text of a film, etc.).

If the user selected the option of using screen text as a condition for recording, then, in step 404, DVR 101, personal computer 200 receives a selection of an area on the display (e.g., DTV display 102) to use for character recognition in the on-screen text. For example, the user may indicate to only monitor for keywords (discussed further below) in on-screen text that is displayed in a small screen area (e.g., lower right-hand corner of television screen).

In step 405, DVR 101, personal computer 200 receives keyword(s) (e.g., "stimulus," "plan," "Detroit Tigers,") to trigger recording video content based on one or more of these keyword(s) appearing in the on-screen text. Keyword(s), as used herein, includes multiple words or terms, phrases, etc.

In step 406, DVR 101, personal computer 200 receives a selection from the user as to how much time before or after the condition is met to start recording. As will be discussed further below, DVR 101, personal computer 200 may store the video content of the selected program, such as in HDD 110, 203, while DVR 101, personal computer 200 is monitoring for these keyword(s) in the on-screen text, closed captioning text and/or program audio. In this manner, the user may be able to start recording a segment of the selected television program or a television program airing on the selected television channel prior to the condition (e.g., keyword of "stimulus" being used in on-screen text) being met as discussed further below.

If, however, the user did not select the option of using screen text as a condition for recording, or upon receiving a selection from the user as to how much time before or after the condition is met to start recording, then, in step 407, a determination is made by DVR 101, personal computer 200 as to whether the user selected the option of closed captioning text as a condition for recording. Closed captioning text, as used herein, refers to subtitles as well as captions that are used to describe all significant content, such as audio content (spoken dialogue and non-speech information, such as the identity of the speakers, and, occasionally, their manner of speaking, along with any significant music or sound effects using words or symbols), that are displayed on display 102, 207 during the airing of the television program.

If the user selected the option of using closed captioning text as a condition for recording, then, referring to FIG. 4B, in conjunction with FIGS. 1-3, in step 408, a determination is made by DVR 101, personal computer 200 as to whether the user selected a different set of keyword(s) to trigger recording video content (as opposed to the set of keyword(s) received in step 405 of FIG. 4A used to trigger recording video content) based on one or more of these keyword(s) appearing in the closed captioning text.

If the user selected a different set of keyword(s) to trigger recording video content, then, in step 409, DVR 101, personal computer 200 receives a different set of keyword(s) (e.g., "debt," "Detroit Red Wings,") to trigger recording video content based on one or more of these keyword(s) appearing in the closed captioning text.

If the user did not select a different set of keyword(s) to trigger recording video content, or upon receiving a different set of keyword(s) to trigger recording video content based on one or more of these keyword(s) appearing in the closed captioning text, then, in step 410, DVR 101, personal computer 200 receives a selection from the user as to how much time before or after the condition is met to start recording.

If, however, the user did not select the option of using closed captioning text as a condition for recording (discussed above in connection with step 407 of FIG. 4A), or upon receiving a selection from the user as to how much time before or after the condition is met to start recording, then, in step 411, a determination is made by DVR 101, personal computer 200 as to whether the user selected the option of using program audio as a condition for recording. Program audio, as used herein, refers to the audible content in the selected television program.

If the user did not select the option of using program audio as a condition for recording, then, in step 412, a determination is made by DVR 101, personal computer 200 as to whether the user selected multiple conditions (e.g., on-screen text and closed captioning text) for triggering recording.

If the user did not select multiple conditions for triggering recording, then DVR 101, personal computer 200 receives a further selection of a television program or a television channel to record video content from the user in step 401 of FIG. 4A.

If, however, the user selected multiple conditions for triggering recording, then, in step 413, DVR 101, personal computer 200 receives an indication as to whether these multiple conditions are to be utilized independently from one another or in conjunction with each other in determining whether to record video content from the selected television program or from a television program airing on the selected television channel. In this manner, the user is provided the option of recording video content when one of the conditions is met (e.g., recording video content in response to detecting keyword(s) in on-screen text or in response to detecting keyword(s) in closed captioning text) or when multiple conditions are met (recording video content in response to detecting keyword(s) in on-screen text and detecting keyword(s) in closed captioning text) as discussed further below.

Upon receiving an indication as to whether these multiple conditions are to be utilized independently from one another or in conjunction with each other in determining whether to record video content from the selected television program or from a television program airing on the selected television channel, DVR 101, personal computer 200 receives a further selection of a television program or a television channel to record video content from the user in step 401 of FIG. 4A.

Returning to step 411, if, however, the user selected the option of using program audio as a condition for recording, then, in step 414, a determination is made by DVR 101, personal computer 200 as to whether the user selected a different set of keyword(s) to trigger recording video content (as opposed to the set of keyword(s) received in step 405 or step 409 used to trigger recording video content) based on one or more of these keyword(s) spoken in the audible content of the selected television program or in the television program airing on the selected television channel.

If the user selected a different set of keyword(s) to trigger recording video content, then, in step 415, DVR 101, personal computer 200 receives a different set of keyword(s) (e.g., "deficit," "Michigan Wolverines,") to trigger recording video content based on one or more of these keyword(s) being spoken in the audible content of the selected television program or in the television program airing on the selected television channel.

If the user did not select a different set of keyword(s) to trigger recording video content, or upon receiving a different set of keyword(s) to trigger recording video content based on one or more of these keyword(s) being spoken in the audible content of the selected television program or in the television program airing on the selected television channel, then, referring to FIG. 4C, in conjunction with FIGS. 1-3, in step 416, DVR 101, personal computer 200 receives a selection from the user as to how much time before or after the condition is met to start recording.

In step 417, a determination is made by DVR 101, personal computer 200 as to whether the user selected multiple conditions (e.g., on-screen text, closed captioning text and program audio) for triggering recording.

If the user did not select multiple conditions for triggering recording, then DVR 101, personal computer 200 receives a further selection of a television program or a television channel to record video content from the user in step 401 of FIG. 4A.

If, however, the user selected multiple conditions for triggering recording, then, in step 418, DVR 101, personal computer 200 receives an indication as to whether these multiple conditions are to be utilized independently from one another or in conjunction with each other in determining whether to record video content from the selected television program or from the television program airing on the selected television channel. In this manner, the user is provided the option of recording video content when one of the conditions is met (e.g., recording video content in response to detecting keyword(s) in on-screen text or in response to detecting keyword(s) in program audio) or when multiple conditions are met (recording video content in response to detecting keyword(s) in on-screen text, detecting keyword(s) in closed captioning text as well as detecting keyword(s) in program audio) as discussed further below.

Upon receiving an indication as to whether these multiple conditions are to be utilized independently from one another or in conjunction with each other in determining whether to record video content from the selected television program or in the television program airing on the selected television channel, DVR 101, personal computer 200 receives a further selection of a television program or a television channel to record video content from the user in step 401 of FIG. 4A.

These conditions (identifying keyword(s) in on-screen text, closed captioning text and/or program audio) may be utilized by DVR device 101, personal computer 200 to trigger recording a segment of a television program as discussed below in connection with FIG. 5.

FIG. 5 is a flowchart of a method 500 for recording video content in relevant segments of a television program based on identifying keywords in on-screen text, closed captioning text and/or program audio in accordance with an embodiment of the present invention.

Referring to FIG. 5, in conjunction with FIGS. 1-3 and 4A-4C, in step 501, DVR 101, personal computer 200 monitors the television program (television program selected by the user in step 401 of FIG. 4A) or in the television program airing on the selected television channel (television channel selected by the user in step 401 of FIG. 4A) for keyword(s) entered by the user in on-screen text, closed captioning text and/or program audio selected by the user. Monitoring for keyword(s), as used herein, includes monitoring for a different set of keyword(s) in each of the conditions (e.g., on-screen text, closed captioning text, program audio) selected by the user.

In step 502, DVR 101, personal computer 200 stores the video content of the selected program or in the television program airing on the selected television channel, such as in HDD 110, 203, while DVR 101, personal computer 200 is monitoring for these keyword(s) in the on-screen text, closed captioning text and/or program audio in step 501. In this manner, the user may be able to start recording a segment of the television program prior to the condition (e.g., keyword of "stimulus" being used in on-screen text) being met as discussed further below.

In step 503, a determination is made by DVR 101, personal computer 200 as to whether it detected any keyword(s) (including different sets of keyword(s)) in on-screen text, closed captioning text and/or program audio. In one embodiment, DVR 101, personal computer 200 utilizes character/word/pattern recognition software to recognize the user selected keyword(s) in the on-screen text and in the closed captioning text. Such character/word/pattern recognition may include case sensitivity. In one embodiment, DVR 101, personal computer 200 utilizes audio recognition software to recognize keyword(s) spoken in the program audio. In one embodiment, the character/word/pattern recognition software and audio recognition software reside in program and video memory 106, memory 202.

In one embodiment, the conditional criteria (i.e., detecting keyword(s) in on-screen text, closed captioning text and/or program audio) may be utilized independently from one another or in conjunction with each other in determining whether to trigger recording of the video content in the television program. In this manner, the user is provided the option of recording video content when one of the conditions is met (e.g., recording video content in response to detecting keyword(s) in on-screen text) or when multiple conditions are met (recording video content in response to detecting keyword(s) in on-screen text and detecting keyword(s) in closed captioning text).

If DVR 101, personal computer 200 did not detect any keyword(s) in on-screen text, closed captioning text and/or program audio, then DVR 101, personal computer 200 continues to monitor the selected television program (television program selected by the user in step 401 of FIG. 4A) or in the television program airing on the selected television channel (television channel selected by the user in step 401 of FIG. 4A) for keyword(s) entered by the user in on-screen text, closed captioning text and/or program audio selected by the user.

If, however, DVR 101, personal computer 200 did detect keyword(s) being used in on-screen text, closed captioning text and/or program audio, then, in step 504, DVR 101, personal computer 200 records the video content in the selected television program or in the television program airing on the selected television channel for the selected period of time. As discussed above, the start time of the recording may occur prior to the identification of the keyword in the on-screen text, closed captioning text and/or program audio. For example, suppose the user entered an audio recording criteria of "Green Bay Packers" and selected that this criteria be executed against a specific news broadcast as well as specified to start recording 30 seconds before the trigger (identifying the keyword(s) in the program audio) with a recordation duration time of 5 minutes. Then, when the reporter states "Green Bay Packers," DVR 101, personal computer 200 will obtain the previous 30 seconds of recording from storage, such as HDD 110, 203, and continue recording the television program for a total duration of 5 minutes, unless the keyword "Green Bay Packers" was stated a further time during the recording of the television program, in which case the recording will be extended, such as for the next 4 and ½ minutes (previous 30 seconds was already recorded).

In this manner, the user will be able to record video content in relevant segments of a television program based on identifying keyword(s) in on-screen text, closed captioning text and/or program audio thereby saving space on the storage device (no longer storing video content that the user has no interest in viewing) and enhancing the user's experience (the user no longer has to spend time fast forwarding through sections of the recorded television program that the user is not interested in viewing).

Upon starting the recording of the video content in the television program for the selected period of time, in step 505, a determination is made by DVR 101, personal computer 200 as to whether the keyword(s) detected in step 503 are detected a further time in on-screen text, closed captioning text and/or program audio during the recording of the television program. For instance, referring to the above example, DVR 101, personal computer 200 may have detected the use of the keyword "Green Bay Packers" in the program audio a subsequent time during the initial recording of the television program. As a result, the recording of the video clip will be extended for an additional period of time (e.g., 5 minutes).

If DVR 101, personal computer 200 detected the use of the keyword(s) a further time in on-screen text, closed captioning text and/or program audio during the recording of the television program (television program selected by the user in step 401 of FIG. 4A or in the television program airing on the television channel selected by the user in step 401 of FIG. 4A), then, in step 506, DVR 101, personal computer 200 extends the length of time of recording the video content (i.e., extends the length of the video clip) for an additional period of time (e.g., 5 minutes), such as the period of time selected by the user in step 402 of FIG. 4A.

If DVR 101, personal computer 200 did not detect the use of the keyword(s) a further time in on-screen text, closed captioning text and/or program audio during the recording of the television program (television program selected by the user in step 401 of FIG. 4A or in the television program airing on the television channel selected by the user in step 401 of FIG. 4A), then DVR 101, personal computer 200 continues to determine as to whether the keyword(s) detected in step 503 are detected a further time in on-screen text, closed captioning text and/or program audio during the recording of the television program in step 505.

Once these video clips are stored, such as in HDD 110, 203, video clips that are related, such as by topic, may be stored together based on the keyword(s) entered by the user. For example, suppose that the user entered the keywords of "Detroit Lions," "Matthew Stafford," and "Calvin Johnson," where "Matthew Stafford" and "Calvin Johnson," are football players for the Detroit Lions football team. Suppose further that a first video clip was recorded in the morning based on the use of the keyword "Detroit Lions," a second video clip was recorded in the afternoon based on the use of the keyword "Matthew Stafford," and a third video clip was recorded in the late afternoon based on the keyword "Calvin Johnson." These video clips are related since the recorded video clips involve the Detroit Lions football team. Since these video clips all use one or more of the keywords related to the Detroit Lions football team, it may be inferred that they are related. As a result, these video clips may be stored together for the convenience of the user, if the user so chooses, so that the user can view the related recorded video content all together in the same setting rather than watching these video clips separately as discussed below in connection with FIG. 6.

FIG. 6 is a flowchart of a method 600 for storing related video clips together so that the user can view the related recorded video content all together in the same setting in accordance with an embodiment of the present invention.

Referring to FIG. 6, in conjunction with FIGS. 1-3, 4A-4C and 5, in step 601, a determination is made by DVR 101, personal computer 200 as to whether the user prefers to store related video clips together.

If the user prefers to store related video clips together, then, in step 602, DVR 101, personal computer 200 identifies the related video clips based on keyword(s) entered by the user, such as described above.

In step 603, DVR 101, personal computer 200 stores the related video clips together, such as in HDD 110, 203. In this manner, the user can view the related recorded video content all together in the same setting rather than watching these video clips separately.

If, however, the user does not prefer to store the related video clips together, then, in step 604, DVR 101, personal computer 200 continues to store the video clips separately.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for recording program content, the method comprising:
   receiving a selection of a television program or a television channel to record video content;
   receiving a selection of a period of time to record said video content in said selected television program or in a television program airing on said selected television channel;
   receiving a first set of one or more keywords to trigger recording said video content in said selected television program or in said television program airing on said selected television channel in response to one or more of said first set of keywords being used in on screen text, wherein said on screen text excludes closed captioning text;
   receiving a second set of one or more keywords to trigger recording said video content in said selected television program or in said television program airing on said selected television channel in response to one or more of said second set of keywords being used in program audio;
   receiving a third set of one or more keywords to trigger recording said video content in said selected television program or in said television program airing on said selected television channel in response to one or more of said third set of keywords being used in said closed captioning text;
   monitoring said television program or said television channel for said first set of one or more keywords being used in said on screen text, said second set of one or more keywords being used in said program audio and said third set of one or more keywords being used in said closed captioning text;
   detecting, by a processor, one or more keywords in said first set of one or more keywords, said second set of one or more keywords and/or said third set of one or more keywords in said on screen text, said program audio and/or said closed captioning text, respectively, in said selected television program or in said television program airing on said selected television channel; and
   triggering a recording of said video content in said selected television program or in said television program airing on said selected television channel for said selected period of time in response to detecting said one or more keywords in said first set of one or more keywords, said second set of one or more keywords and/or said third set of one or more keywords in said on screen text, said program audio and/or said closed captioning text, respectively, in said selected television program or in said television program airing on said selected television channel.

2. The method as recited in claim 1 further comprising:
   receiving a selection of an area on a display to use for character recognition in said on screen text displayed in said selected area.

3. The method as recited in claim 1 further comprising:
   receiving a selection as to how much time before or after detecting said one or more keywords in said first set of one or more keywords, said second set of one or more keywords and/or said third set of one or more keywords in said on screen text, said program audio and/or said closed captioning text, respectively, to start recording said video content in said selected television program or in said television program airing on said selected television channel.

4. The method as recited in claim 1, wherein each of said first set of one or more keywords, said second set of one or more keywords and said third set of one or more keywords contains different keywords.

5. The method as recited in 1 further comprising:
   triggering said recording of said video content in said selected television program or in said television program airing on said selected television channel for said selected period of time in response to detecting said one or more keywords in two or more of said first set of one or more keywords, said second set of one or more keywords and said third set of one or more keywords in said on screen text, said program audio and said closed captioning text, respectively, in said selected television program or in said television program airing on said selected television channel.

6. The method as recited in claim 1 further comprising:
   detecting one or more keywords in said first set of one or more keywords, said second set of one or more keywords and/or said third set of one or more keywords in said on screen text, said program audio and/or said closed captioning text, respectively, a subsequent time in said selected television program or in said television program airing on said selected television channel during said recording of said video content in said selected television program or in said television program airing on said selected television channel; and
   extending a length of time of recording said video content in said selected television program or in said television program airing on said selected television channel by said selected period of time to record said video content in response to detecting said one or more keywords in said first set of one or more keywords, said second set of one or more keywords and/or said third set of one or more keywords in said on screen text, said program audio and/or said closed captioning text, respectively, said subsequent time in said selected television program or in said television program airing on said selected television channel during said recording of said video content.

7. The method as recited in claim 1 further comprising:
   storing related video clips together based on said one or more keywords used to trigger recording said video content.

8. A computer program product for recording program content, the computer program product comprising a computer readable storage medium having program code embodied therewith, the program code comprising the programming instructions for:
   receiving a selection of a television program or a television channel to record video content;
   receiving a selection of a period of time to record said video content in said selected television program or in a television program airing on said selected television channel;
   receiving a first set of one or more keywords to trigger recording said video content in said selected television program or in said television program airing on said selected television channel in response to one or more of said first set of keywords being used in on screen text, wherein said on screen text excludes closed captioning text;

receiving a second set of one or more keywords to trigger recording said video content in said selected television program or in said television program airing on said selected television channel in response to one or more of said second set of keywords being used in program audio;

receiving a third set of one or more keywords to trigger recording said video content in said selected television program or in said television program airing on said selected television channel in response to one or more of said third set of keywords being used in said closed captioning text;

monitoring said television program or said television channel for said first set of one or more keywords being used in said on screen text, said second set of one or more keywords being used in said program audio and said third set of one or more keywords being used in said closed captioning text;

detecting one or more keywords in said first set of one or more keywords, said second set of one or more keywords and/or said third set of one or more keywords in said on screen text, said program audio and/or said closed captioning text, respectively, in said selected television program or in said television program airing on said selected television channel; and triggering a recording of said video content in said selected television program or in said television program airing on said selected television channel for said selected period of time in response to detecting said one or more keywords in said first set of one or more keywords, said second set of one or more keywords and/or said third set of one or more keywords in said on screen text, said program audio and/or said closed captioning text, respectively, in said selected television program or in said television program airing on said selected television channel.

9. The computer program product as recited in claim 8, wherein the program code further comprises the programming instructions for:

receiving a selection of an area on a display to use for character recognition in said on screen text displayed in said selected area.

10. The computer program product as recited in claim 8, wherein the program code further comprises the programming instructions for:

receiving a selection as to how much time before or after detecting said one or more keywords in said first set of one or more keywords, said second set of one or more keywords and/or said third set of one or more keywords in said on screen text, said program audio and/or said closed captioning text, respectively, to start recording said video content in said selected television program or in said television program airing on said selected television channel.

11. The computer program product as recited in claim 8, wherein each of said first set of one or more keywords, said second set of one or more keywords and said third set of one or more keywords contains different keywords.

12. The computer program product as recited in claim 8, wherein the program code further comprises the programming instructions for:

triggering said recording of said video content in said selected television program or in said television program airing on said selected television channel for said selected period of time in response to detecting said one or more keywords in two or more of said first set of one or more keywords, said second set of one or more keywords and said third set of one or more keywords in said on screen text, said program audio and said closed captioning text, respectively, in said selected television program or in said television program airing on said selected television channel.

13. The computer program product as recited in claim 8, wherein the program code further comprises the programming instructions for:

detecting one or more keywords in said first set of one or more keywords, said second set of one or more keywords and/or said third set of one or more keywords in said on screen text, said program audio and/or said closed captioning text, respectively, a subsequent time in said selected television program or in said television program airing on said selected television channel during said recording of said video content in said selected television program or in said television program airing on said selected television channel; and extending a length of time of recording said video content in said selected television program or in said television program airing on said selected television channel by said selected period of time to record said video content in response to detecting said one or more keywords in said first set of one or more keywords, said second set of one or more keywords and/or said third set of one or more keywords in said on screen text, said program audio and/or said closed captioning text, respectively, said subsequent time in said selected television program or in said television program airing on said selected television channel during said recording of said video content.

14. The computer program product as recited in claim 8, wherein the program code further comprises the programming instructions for:

storing related video clips together based on said one or more keywords used to trigger recording said video content.

15. A digital video recorder device, comprising:

a memory unit for storing a computer program for recording program content; and a processor coupled to the memory unit, wherein the processor is configured to execute the program instructions of the computer program comprising:

receiving a selection of a television program or a television channel to record video content;

receiving a selection of a period of time to record said video content in said selected television program or in a television program airing on said selected television channel;

receiving a first set of one or more keywords to trigger recording said video content in said selected television program or in said television program airing on said selected television channel in response to one or more of said first set of keywords being used in on screen text, wherein said on screen text excludes closed captioning text;

receiving a second set of one or more keywords to trigger recording said video content in said selected television program or in said television program airing on said selected television channel in response to one or more of said second set of keywords being used in program audio;

receiving a third set of one or more keywords to trigger recording said video content in said selected television program or in said television program airing on said selected television channel in response to one or more of said third set of keywords being used in said closed captioning text;

monitoring said television program or said television channel for said first set of one or more keywords being used in said on screen text, said second set of one or more keywords being used in said program audio and said third set of one or more keywords being used in said closed captioning text;

detecting one or more keywords in said first set of one or more keywords, said second set of one or more keywords and/or said third set of one or more keywords in said on screen text, said program audio and/or said closed captioning text, respectively, in said selected television program or in said television program airing on said selected television channel; and triggering a recording of said video content in said selected television program or in said television program airing on said selected television channel for said selected period of time in response to detecting said one or more keywords in said first set of one or more keywords, said second set of one or more keywords and/or said third set of one or more keywords in said on screen text, said program audio and/or said closed captioning text, respectively, in said selected television program or in said television program airing on said selected television channel.

16. The system as recited in claim 15, wherein the program instructions of the computer program further comprise:
receiving a selection of an area on a display to use for character recognition in said on screen text displayed in said selected area.

17. The system as recited in claim 15, wherein the program instructions of the computer program further comprise:
receiving a selection as to how much time before or after detecting said one or more keywords in said first set of one or more keywords, said second set of one or more keywords and/or said third set of one or more keywords in said on screen text, said program audio and/or said closed captioning text, respectively, to start recording said video content in said selected television program or in said television program airing on said selected television channel.

18. The system as recited in claim 15, wherein each of said first set of one or more keywords, said second set of one or more keywords and said third set of one or more keywords contains different keywords.

19. The system as recited in claim 15, wherein the program instructions of the computer program further comprise:
triggering said recording of said video content in said selected television program or in said television program airing on said selected television channel for said selected period of time in response to detecting said one or more keywords in two or more of said first set of one or more keywords, said second set of one or more keywords and said third set of one or more keywords in said on screen text, said program audio and said closed captioning text, respectively, in said selected television program or in said television program airing on said selected television channel.

20. The system as recited in claim 15, wherein the program instructions of the computer program further comprise:
detecting one or more keywords in said first set of one or more keywords, said second set of one or more keywords and/or said third set of one or more keywords in said on screen text, said program audio and/or said closed captioning text, respectively, a subsequent time in said selected television program or in said television program airing on said selected television channel during said recording of said video content in said selected television program or in said television program airing on said selected television channel; and extending a length of time of recording said video content in said selected television program or in said television program airing on said selected television channel by said selected period of time to record said video content in response to detecting said one or more keywords in said first set of one or more keywords, said second set of one or more keywords and/or said third set of one or more keywords in said on screen text, said program audio and/or said closed captioning text, respectively, said subsequent time in said selected television program or in said television program airing on said selected television channel during said recording of said video content.

* * * * *